United States Patent
Kabalnov

(10) Patent No.: US 6,432,183 B1
(45) Date of Patent: Aug. 13, 2002

(54) MICROEMULSION TECHNIQUES FOR INK JET INKS

(75) Inventor: Alexey S Kabalnov, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/552,145

(22) Filed: Apr. 19, 2000

(51) Int. Cl.[7] ............................................... C09D 11/02
(52) U.S. Cl. .................. 106/31.25; 106/31.49; 106/31.58; 106/31.27
(58) Field of Search .................... 106/31.25, 31.27, 106/31.58, 31.49

(56) References Cited

U.S. PATENT DOCUMENTS

| | | | | |
|---|---|---|---|---|
| 4,783,220 A | * | 11/1988 | Gamble et al. .......... | 106/31.59 |
| 5,226,957 A | | 7/1993 | Wickramanayake et al. ..... | 106/31.26 |
| 5,275,647 A | * | 1/1994 | Winnik .................... | 106/31.59 |
| 5,484,475 A | * | 1/1996 | Breton et al. ............ | 106/31.58 |
| 5,492,559 A | | 2/1996 | Oliver et al. ............ | 106/31.25 |
| 5,565,022 A | | 10/1996 | Wickramanayake ..... | 106/31.25 |
| 5,626,654 A | * | 5/1997 | Breton et al. ............ | 106/31.33 |
| 5,643,357 A | | 7/1997 | Breton et al. ............ | 106/31.25 |
| 6,245,137 B1 | * | 6/2001 | Gore ....................... | 106/31.59 |

OTHER PUBLICATIONS

Shinoda, Phys. Chem. 1985, 89, 338–352, Phase Equilibria in a Three Component Water–Soap–Alcohol System. A Therodynamic Model, No month available.

Society of Dyers and Colourists, Color Index, vol. 3, 3rd ed, 1971 3563–3648, No month available.

* cited by examiner

Primary Examiner—Helene Klemanski
Assistant Examiner—Veronica F. Faison
(74) Attorney, Agent, or Firm—W. Bradley Haymond

(57) ABSTRACT

Aqueous inkjet inks with oil-soluble dyes that are made more soluble in the aqueous vehicle by making a microemulsion in the ink of solvent moieties with both solubilizing groups and hydrophobic groups.

16 Claims, 4 Drawing Sheets

MICROEMULSION TECHNIQUES FOR INK JET INKS

FIELD OF INVENTION

The invention relates to aqueous inkjet inks with oil-soluble dyes that are made more soluble in the aqueous vehicle by making a microemulsion in the ink of solvent moieties with both solubilizing groups and hydrophobic groups.

BACKGROUND OF INVENTION

The use of inkjet printing systems has grown dramatically in recent years. This growth may be attributed to substantial improvements in print resolution and overall print quality coupled with appreciable reduction in cost. Today's inkjet printers offer acceptable print quality for many commercial, business, and household applications at costs fully an order of magnitude lower than comparable products available just a few years ago. Notwithstanding their recent success, intensive research and development efforts continue toward improving inkjet print quality, while further lowering cost to the consumer.

An inkjet image is formed when a precise pattern of dots is ejected from a drop-generating device known as a "printhead" onto a printing medium. The typical inkjet printhead has an array of precisely formed nozzles located on a nozzle plate and attached to an inkjet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 $\mu$m×35 $\mu$m. The printhead is held and protected by an outer packaging referred to as a print cartridge, i.e., inkjet pen.

Upon energizing of a particular resistor element, a droplet of ink is expelled through the nozzle toward the print medium, whether paper, transparent film or the like. The firing of ink droplets is typically under the control of a microprocessor, the signals of which are conveyed by electrical traces to the resistor elements, thereby forming alphanumeric and other characters on the print medium.

Water is the most attractive solvent for inkjet ink. Because of this, drop-on-demand inkjet inks are 50–90% water. Accordingly, most of the inkjet ink formulations are based on water-soluble colorants, that is, water-soluble dyes or water-dispersible pigments. This comes at the price that inkjet images are not stable to water, in particular, to the action of water combined with rubbing (so-called wet smudge).

On the other hand, there are many inks in the art that are stable to the action of water. These inks are based on organic solvents and use solvent-soluble dyes or solvent-dispersible pigments. These inks are widely used in such areas as continuous inkjet and gravure printing inks. The solvent systems used in these applications are methylethylketone, methylbutylketone, acetone, toluene, ethyl acetate, as well as solvent mixtures, such as 40% ethyl acetate, 40% ethyl alcohol, and 20% toluene. These solvents however are hard to use in drop-on-demand inkjet. The main reasons for this are: (1) The high activity of the solvents towards the printhead materials; and (2) objectionable smell and toxicity. In addition, for bubble-jet (but not for piezo inkjet), there are the additional problems in these solvent systems of (1) poor bubble nucleation and (2) inadequate temperature control, both of which lead to overheating the printheads. Moreover, when the solvent-based inks are not dried quickly by evaporation, they tend to penetrate deep into the paper, thereby deteriorating the image quality.

An approach to improve the attributes described above are various 'emulsion' techniques. Emulsions represent a plurality of droplets of one liquid in another. Emulsions can be of two different types, e.g., oil-in-water (O/W) or water-in-oil (W/O). In addition to this, emulsions can be microemulsions and macroemulsions. Microemulsions are thermodynamically equilibrium systems. Some microemulsions are also known as "swollen micelles", which means that they represent surfactant micelles with the oil solubilized inside. Typical microemulsion particle size is 5–50 nm. Microemulsions are normally transparent or slightly bluish because of the very small particle size. On the other hand, macroemulsions are not in thermodynamic equilibrium and do not form spontaneously, that is, they require mechanical agitation for preparation. Furthermore, their particle size is larger, 50 nm and up. One of the common examples of macroemulsions is milk. Finally, 'miniemulsions' are a special case of macroemulsions with smaller particle size, below 1 $\mu$m. They are not thermodynamically stable and do not form spontaneously; however, they can be made kinetically stable, so that the particle size does not change with time.

The use of microemulsions in inkjet ink has been known in the art for several years. Thus, in the patent of Wickramanayake et al., (U.S. Pat. No. 5,226,957) entitled "Solubilization of Water-Insoluble Dyes via Microemulsions for Bleedless, Non-Threading, High Print Quality Inks for Thermal Inkjet Printers", it is suggested to incorporate an oil-soluble dye into a microemulsion, which contained solvents, surfactants, co-surfactants, and water. In another patent of Wickramanayake (U.S. Pat. No. 5,565,022, "Fast-Drying, Bleed-Free Inkjet Ink Compositions"), it is suggested to incorporate a dye into a mixture of an organic solvent, surfactant, and water, so that the dye and water-insoluble solvent are solubilized by the surfactant. In U.S. Pat. No. 5,643,357 (Brenton et al., "Liquid Crystalline Ink Compositions"), an ink composition is suggested, that contains a surfactant, and oil-or-alcohol-soluble dye, and water. The formulation undergoes a phase transition upon heating from a microemulsion phase to a lamellar phase, which helps to stratify the inks to the surface of the paper, when the printing substrate is heated. In the U.S. Pat. No. 5,492,559 (Oliver et al., "Liquid Crystalline Microemulsion Ink Compositions"), an ink formulation is described containing an aqueous phase, oil phase, and surfactant, and an oil-soluble dye, such that the system undergoes a microemulsion-liquid crystalline state transition with decreasing temperature. The idea is (with some variations) to solubilize water insoluble "solvent" dyes in micelles, and thereby, produce water and smudgefast images.

All the known microemulsion formulations fall short of attaining a good print quality because of the excessive ink penetration into the paper and wicking along the fibers. Also, the need remains in solvents that have less smell, lower toxicity, and higher solubilizing capacity towards the solvent dyes. Finally, the need remains for a solvent system that combines all these attributes together, which is not a trivial task.

A major formulation problem involved in this approach is the limited solubility of the solvent dyes in the microemulsion formulations. Indeed, in order to get the full benefits of water-based inks, that is, the good bubble nucleation and temperature control, low toxicity and smell, and moderate viscosity, the weight percentage of the solvent in the ink should not exceed 50%; more preferably, it should not exceed 20%. If one further assumes that the solvent dye is completely water-insoluble and dissolves only in the solvent domains of the microemulsion, then, in order to get the dye load of 3%, typical for drop-on-demand inkjet, one needs the solubility of the dye in the solvent to be at least 6%, preferably at least 15%. Even higher solubility is in fact desired to prevent the spontaneous crystallization of the dyes from the solution caused by temperature variations. 20–50% solubility of the dye is highly desirable. However, most solvent dyes cannot be dissolved to such a degree in apolar oils conventionally used in microemulsion formulations. The reason for this is the fact that most of the solvent dyes conventionally used in inkjet inks are not soluble in both water and hydrocarbons.

SUMMARY OF THE INVENTION

The present invention relates to an aqueous inkjet ink composition comprising:
(a) dye molecules;
(b) micelles comprising a solvent of a formula R—S, S being a dye-solubilizing group and R being a hydrophobic group; and
(c) an aqueous vehicle,
wherein the micelles are surrounded by the aqueous vehicle, each micelle having a monolayer surface enclosing an inside area of the micelle, the hydrophobic groups (R) extending into the inside area of the micelle from the monolayer surface and the dye-solubilizing groups (S) being at the monolayer surface of the micelles, and the dye molecules associating with the dye-solubilizing groups (S) at the monolayer surface of the micelles, the micelles separating the dye particles from the aqueous vehicle.

The present invention further relates to a method of making an aqueous inkjet ink composition comprising the steps of:
a) forming micelles in an aqueous vehicle by adding chemical compounds to an aqueous vehicle, the chemical compounds comprising a solvent of a formula R—S, R being a hydrophobic group and S being a dye-solubilizing group, each micelle having a monolayer surface enclosing an inside area of the micelle, the hydrophobic groups (R) extending into the inside area of the micelle and the dye-solubilizing groups (S) being at the monolayer surface of the micelle; and
b) solubilizing dye molecules in the aqueous vehicle by adding dye molecules to the aqueous vehicle of a), the dye molecules associating with the dye-solubilizers at the monolayer surface of the micelles, the micelles separating the dye particles from the aqueous vehicle.

DETAILED DESCRIPTION OF THE INVENTION

Figure 1:
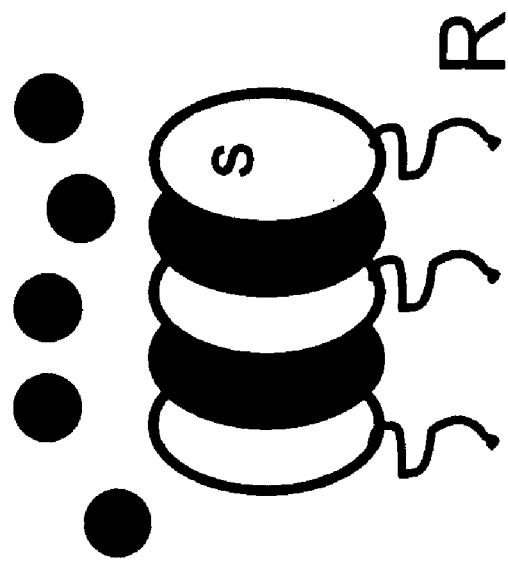
FIG. 1 shows the dye molecule (filled ellipse) on the left in non-structured solution of the dye solubilizing group, S, (unfilled ellipse) in water (filled black circles). The solubility is reduced because of the unfavorable contact between the dye and water. On the right when the dye solubilizing group, S, are structured with the help of grafted hydrophobic tails, R, the solubility increases.
Figure 1:
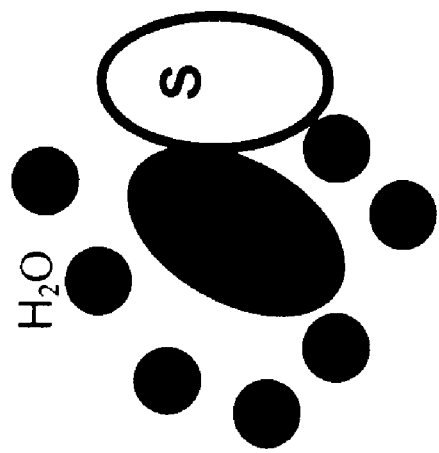

The present invention described herein is directed to inkjet inks for printing inkjet images using commercially available inkjet printers such as, for example but not limited to, HP DeskJet® printers, manufactured by Hewlett-Packard Company, of Palo Alto, Calif. The inks enable production of near photographic images having little or no coalescence, excellent waterfastness, and reduced dry time, on a range of print media, in particular, for example but not limited to, plain white, 8½"×11", 20 lb. weight, printer paper conventionally used for office and home computers.

As discussed above, there is a considerable demand for better permanence of inkjet images. Waterfastness, highlighter smearfastness and stability to wet and dry finger smudge are especially desirable.

Attempts to achieve the above desirable qualities inkjet inks have lead to the formulation of water-based inks with solvent-soluble dyes in microemulsions.

Microemulsions represent single-phase thermodynamically equilibrium mixtures of a surfactant, optionally, a co-surfactant, an oil and water. Surfactant molecules consist of two blocks: a hydrocarbon tail, and a polar head. The term "oil" is broadly used in this application and means any water-immiscible solvent, such as alkanes, esters or ethers. Some other solvents that have more distinct surfactant-like structures, e.g., alcohols, are normally classified as "co-surfactants". Finally "water" here means an aqueous solution of salts, or other water-compatible solvents such as glycols or glycerol, or their water-soluble derivatives.

The structure of a microemulsion represents water domains separated from the oil domains by a surfactant monolayer film. If a co-surfactant is present in the system, it tends to assemble together with the co-surfactant, forming a mixed monolayer. Normally, the system represents small 1–10 nm oil drops ("swollen micelles") dispersed in water, with the surfactant molecules assembled at the interface. However, other surfactant assemblies, such as bilayer aggregates (lamellar phase, vesicles) are also possible. After the structure is formed, the solvent soluble dye can be solubilized into the hydrophobic interior of the drops.

Solvent dyes are defined as dyes soluble in organic solvents and virtually insoluble in water. An extensive list of solvent dyes can be found in Colour Index, Third edition, Volume 3, 1971, published by The society of Dyers and Colourists, pp 3563–3648. For some of the solvent dyes, the solubility properties in a wide variety of organic solvents have been determined. Thus, Clariant GmbH, Division of Pigments and Additives, BU Pigments, Frankfurt, Germany, offers solvent dyes sold under the tradename Savinyl® Dyes. For all these dyes, the solubility in 19 solvents of various polarity, such as water, hydrocarbons, alcohols, ketones, ethers and esters has been evaluated and this data is supplied by the manufacturer. Closer inspection of the solubility tables reveals that the solvent dyes do not dissolve neither in water nor in hydrocarbons (e. g., toluene or white spirit), but dissolve well in rather polar solvents, such as methanol, ethanol, cyclohexanone, 2-pyrrolidone, methylethylketone or in oligoethylene or oligopropylene glycols. In addition to the high polarity, specific chemical moieties in the structure of the solvent can drastically improve the solubility. These chemical moieties are 5-6 membered rings (both saturated and aromatic), ether, and keto-groups. For example, all the Savinyl solvent dyes have 250–500 g/l solubility in cyclohexanone, and most of them dissolve at >100g/l in benzyl alcohol. Similarly, as determined experimentally, 2-pyrrolidinone, tetraethylene glycol, and polyethylene glycol (M=400) dissolve Savinyl Yellow RLS, Savinyl Pink 6BLS, Savinyl Blue GLS, and Savinyl Black NS at~>33 wt %. For simplicity, these solvents will be called below "dye solubilizers" and abbreviated as S. The mechanism of their solvent action is unclear, but apparently represents a combination of polarity match plus specific interactions with the dye chromophores. However, traditional microemulsions cannot be formulated with these solvents, because they are water-miscible. Moreover, the non-structured, binary mixtures of these solvents with water are not effective in solubilizing the solvent dyes. Experiments show that the solubility in such mixed solvents is lower than required, even when the solvent load is very high, >50%, (see the Tables in Example 1).

The present inventor has found that in order to effectively solubilize the solvent dyes in aqueous solution with dye-solubilizing solvents in a microemulsion system, it is important to induce the microscopic separation of dye solubilizing groups of the solvent from the water. One way to achieve this (as shown in FIG. 1) is to graft hydrophobic groups, R, to the dye-solubilizing moieties, S. In an aqueous solution, the hydrophobic groups self-associate and form a micelle, with the dye-solubilizing groups at the surface of the micelle, this micelle surface known as the "palisade layer"[1]. The dyes can then be solubilized into the micellar palisade layer. As opposed to the plain binary mixture of the S and water, the dyes have a much higher solubility in this system, because direct contact of the dye with water is avoided.

One embodiment of this solvent having both dye-solubilizing solvents and grafted hydrophobic groups is alkyl-substituted 2-pyrrolidinones (also known as alkyl-substituted 2-pyrrolidones). These solvents have very little smell, no toxicity and dissolve many solvent dyes. Non-substituted 2-pyrrolidinone itself is polar and completely miscible with water. Alkyl-substituted 2-pyrrolidinones must be therefore regarded as weak surfactants themselves, akin to microemulsion "co-surfactants", which are normally medium-chain alcohols. In conjunction with this solvent, a variety of anionic surfactants can be used. Non-limiting examples of such anionic surfactants are alkylsulfates, alkylcarboxylates and alkylsulfonates, as well as nonionic surfactants.

In another embodiment, the dye-solubilizing group is an oligo(ethylene glycol) —$(CH_2CH_2O)_nH$, where n=1–50. Here various hydrophobic tails R connected to the dye-solubilizing group by an ether or ester bond can be used, For example, one can use ethoxylated alcohols $C_mH_{2m+1}(CH_2CH_2O)_nH$ with m=4–20 and n=1–50. One of the possible candidates is an ethoxylated alcohol with m =8 and n=5, or with m=4 and n=2. Similarly one can use commercial ethoxylated surfactants, such as Tween 20, or Tween 80.

In one embodiment, the present invention relates to an aqueous inkjet ink composition comprising:
 (a) dye molecules;
 (b) micelles comprising a solvent of a formula R—S, S being a dye-solubilizing group and R being a hydrophobic group; and
 (c) an aqueous vehicle,
wherein the micelles are surrounded by the aqueous vehicle, each micelle having a monolayer surface enclosing an inside area of the micelle, the hydrophobic groups (R) extending into the inside area of the micelle from the monolayer surface and the dye-solubilizing groups (S) being at the monolayer surface of the micelles, and the dye molecules associating with the dye-solubilizing groups (S) at the monolayer surface of the micelles, the micelles separating the dye particles from the aqueous vehicle.

In another embodiment, the present invention relates to a method of making an aqueous inkjet ink composition comprising the steps of:
 a) forming micelles in an aqueous vehicle by adding chemical compounds to an aqueous vehicle, the chemical compounds comprising a solvent of a formula R—S, R being a hydrophobic group and S being a dye-solubilizing group, each micelle having a monolayer surface enclosing an inside area of the micelle, the hydrophobic groups (R) extending into the inside area of the micelle and the dye-solubilizing groups (S) being at the monolayer surface of the micelle; and
 b) solubilizing dye molecules in the aqueous vehicle by adding dye molecules to the aqueous vehicle of a), the dye molecules associating with the dye-solubilizing groups at the monolayer surface of the micelles, the micelles separating the dye particles from the aqueous vehicle.

In preferred embodiments of the above-described composition and method, the micelle further comprises surfactants. In more preferred embodiments, the micelle further comprises co-surfactants.

In other preferred embodiments of the above-described composition and method, the dye-solubilizing groups are derived from polar molecules selected from the group consisting of methanol; ethanol; cyclohexanone; 2-pyrrolidone; methylethylketone; oligoethylene glycols, $(CH_2CH_2O)_nH$ (n=1–50) and oligopropylene glycols, $(CH(CH_3)CH_2O)_mH$ (m=1–50). In more preferred embodiments, the dye-solubilizing groups are derived from oligoethylene glycols selected from the group consisting of diethylene glycol, tetraethylene glycol and octaethylene glycol. In other more preferred embodiments, the dye-solubilizing groups are derived from oligopropylene glycols selected from the group consisting of dipropylene glycol, tetrapropylene glycol and octapropylene glycol. In yet other more preferred embodiments, the hydrophobic groups have from 4 to 20 carbon atoms.

In yet other preferred embodiments of the above-described composition and method, the hydrophobic group (R) and the solubilizing group (S) form the solvent of the formula R—S with a bond between R and S selected from a carbon-carbon bond, a carbon-oxygen ether bond, a carbon-oxygen ester bond, a carbon-nitrogen amine bond and a carbon-nitrogen amide bond.

In still other preferred embodiments of the above-described composition and method, the aqueous inkjet ink composition is comprised of from 1 to 5 wt. percent dye.

In yet other preferred embodiments of the above-described composition and method, the aqueous inkjet ink composition is comprised of from 5 to 50 wt. percent of the solvent having the formula R—S.

In still other preferred embodiments of the above-described composition and method, the aqueous inkjet ink composition is comprised of from 50 to 80 wt. percent of the aqueous vehicle.

In yet other preferred embodiments of the above-described composition and method, the dye molecules are selected from the group consisting of Cl Solvent Yellow 79, Cl Solvent Yellow 83:1, Cl Solvent Yellow 83, Cl Solvent Yellow 62, Cl Solvent Orange 41, Cl Solvent Orange 62, Cl Solvent Red 92, Cl Solvent Red 124, Cl Solvent Red 8, Cl Solvent Red 91, Cl Solvent Red 127, Cl Acid Violet 66, Cl Solvent Blue 45, Cl Solvent Blue 44, Cl Solvent Black 45, Cl Solvent Black 27, Solvent Red 217, Solvent Red 218, Neozapon Red 395, Solvent Blue 35, Solvent Black 27, Savinyl Yellow RLS, Savinyl Pink 6BLS, Savinyl Blue GLS, and Savinyl Black NS.

EXAMPLES

Example 1

Typical Microemulsion Formulations.

Some typical microemulsion formulations studied are shown in Tables 1 through 11 below. As S in R—S-solvents, 2-pyrrolidonyl and oligo(ethylene oxide) groups were used. The systems additionally contained humectants and, in some cases, surfactants. All the systems studied were water-based and were in single-phase state at room temperature.

TABLE 1

Microemulsion #1

| Component | wt % |
|---|---|
| 1-Octyl-2-pyrrolidone (Aldrich) | 7 |
| Dodecane (Aldrich) | 3 |
| Sodium dodecyl sulfate (Sigma) | 1 |
| Diethylene glycol (Aldrich) | 3.6 |
| 2-Pyrrolidone (Aldrich) | 3.6 |
| Glycerol (Aldrich) | 9 |
| Trizma Base (Aldrich) | 0.18 |
| Proxel GXL (ICI) | 0.18 |
| EDTA disodium salt (Aldrich) | 0.18 |
| water | balance |

TABLE 2

Microemulsion #2

| Component | wt % |
|---|---|
| 1-Octyl-2-pyrrolidone (Aldrich) | 20 |
| Dodecane (Aldrich) | 2.6 |
| Sodium dodecyl sulfate (Sigma) | 2 |
| Diethylene glycol (Aldrich) | 3 |
| 2-Pyrrolidone (Aldrich) | 3 |
| Glycerol (Aldrich) | 7.5 |
| Trizma Base (Aldrich) | 0.15 |
| Proxel GXL (ICI) | 0.15 |
| EDTA disodium salt (Aldrich) | 0.15 |
| water | balance |

TABLE 3

Microemulsion #4

| component | wt % |
|---|---|
| 1-Octyl-2-pyrrolidone (Aldrich) | 10 |
| sodium octylsulfonate (Sigma) | 1 |
| Diethylene glycol (Aldrich) | 3.6 |
| 2-Pyrrolidone (Aldrich) | 3.6 |
| Glycerol (Aldrich) | 9 |
| Trizma Base (Aldrich) | 0.18 |
| Proxel GXL (ICI) | 0.18 |
| EDTA disodium salt (Aldrich) | 0.18 |
| water | balance |

TABLE 4

Microemulsion #5

| component | wt % |
|---|---|
| 1-Octyl-2-pyrrolidinone (Aldrich) | 16.7 |
| lithium octanoate (Aldrich*) | 1.72 |
| Diethylene glycol (Aldrich) | 3.3 |
| 2-Pyrrolidone (Aldrich) | 3.3 |
| Glycerol (Aldrich) | 8.3 |
| Trizma base (Aldrich) | 0.17 |
| Proxel GXL (ICI) | 0.17 |
| EDTA disodium salt (Aldrich) | 0.17 |
| water | balance |

*prepared by neutralization of n-octanoic acid by lithium hydroxide

TABLE 5

Microemulsion #6

| component | wt % |
|---|---|
| 1-Hexyl-2-pyrrolidone (BASF) | 16.7 |
| lithium octanoate* (Aldrich) | 1.72 |
| Diethylene glycol (Aldrich) | 3.3 |
| 2-Pyrrolidone (Aldrich) | 3.3 |
| Glycerol (Aldrich) | 8.3 |
| Trizma base (Aldrich) | 0.17 |
| Proxel GXL (ICI) | 0.17 |
| EDTA disodium salt (Aldrich) | 0.17 |
| water | balance |

*prepared by neutralization of n-octanoic acid by lithium hydroxide

TABLE 6

Microemulsion #7

| component | wt % |
|---|---|
| 1-Hexyl-2-pyrrolidinone (BASF) | 16.7 |
| Tetramethyl ammonium octanoate* (Aldrich) | 2.3 |
| Diethylene glycol (Aldrich) | 3.3 |
| 2-pyrrolidone (Aldrich) | 3.3 |
| Glycerol (Aldrich) | 8.3 |
| Trizma base (Aldrich) | 0.17 |
| Proxel GXL (ICI) | 0.17 |
| EDTA disodium salt (Aldrich) | 0.17 |
| water | balance |

*prepared by neutralization of n-octanoic acid by tetramethylammonium hydroxide

TABLE 7

Microemulsion #13

| component | wt % |
|---|---|
| Tergitol NP-10 (Union Carbide) | 10 |
| Diethylene glycol (Aldrich) | 3.3 |
| 2-Pyrrolidone (Aldrich) | 3.3 |
| Glycerol (Aldrich) | 8.3 |
| Trizma base (Aldrich) | 0.17 |
| Proxel GXL (ICI) | 0.17 |
| EDTA disodium salt (Aldrich) | 0.17 |
| water | balance |

TABLE 8

Microemulsion #18

| component | wt % |
|---|---|
| n-octoxy(pentaethylene oxide)ol | 20 |
| Diethylene glycol (Aldrich) | 3.3 |
| 2-Pyrrolidone (Aldrich) | 3.3 |
| Glycerol (Aldrich) | 8.3 |
| Trizma base (Aldrich) | 0.17 |
| Proxel GXL (ICI) | 0.17 |
| EDTA disodium salt (Aldrich) | 0.17 |
| water | balance |

TABLE 9

Microemulsion #32

| component | wt % |
|---|---|
| Tween-20 (ICI) | 20 |
| Diethylene glycol (Aldrich) | 3.3 |
| 2-Pyrrolidone (Aldrich) | 3.3 |
| Glycerol (Aldrich) | 8.3 |
| Trizma base (Aldrich) | 0.17 |
| Proxel GXL (ICI) | 0.17 |
| EDTA disodium salt (Aldrich) | 0.17 |
| water | balance |

TABLE 10

Microemulsion #33

| component | wt % |
|---|---|
| Tween-80 (ICI) | 20 |
| Diethylene glycol (Aldrich) | 3.3 |
| 2-Pyrrolidone (Aldrich) | 3.3 |
| Glycerol (Aldrich) | 8.3 |
| Trizma base (Aldrich) | 0.17 |
| Proxel GXL (ICI) | 0.17 |
| EDTA disodium salt (Aldrich) | 0.17 |
| water | balance |

TABLE 11

Microemulsion #34

| component | wt % |
|---|---|
| Lithium octanoate* (Aldrich) | 2 |
| Diethylene glycol monohexyl ether (Union Carbide) | 49 |
| water | 49 |

*prepared by neutralization of n-octanoic acid by lithium hydroxide

Example 2

Viscosities of Some of the Microemulsions Studied

Viscosities, shown in Table 12, were measured using a VE System (Vilastic Scientific, Inc.) at 25° C. Ten measurements were made over the range of shear rates from 10 to 200 s$^{-1}$. The flow was Newtonian in all cases.

TABLE 12

| System | Viscosity, cP |
|---|---|
| Microemulsion #4 | 5.4 |
| Microemulsion #5 | 7.3 |
| Microemulsion #6 | 3.7 |
| Microemulsion #7 | 3.7 |
| Microemulsion #13 | 4.3 |
| Microemulsion #18 | 5.1 |

Example 3

Physical Stability of Microemulsions

Microemulsions #1 and #6 were subjected to thermal variations between 5° C. and 60° C., and to freeze-thaw cycle between −30° C. and room temperature. No phase separation occurred. After freeze-thaw cycle, the systems remained single-phase and became slightly opalescent; the turbidity disappeared on standing.

Example 4

Solubility of Savinyl Dyes in Microemulsions Studied

Solubility of dyes in microemulsions was accessed the following way. Dry dye was added to a microemulsion at around 3 wt%. The sample was placed on rollers and mixed overnight. A 100 μl sample of supernatant was collected and filtered through 0.22 μm filter, after which it was diluted by ethanol by a factor of 1:1000–1:10000 w/w. The concentration of the dye was determined spectrophotometrically by using a calibration constructed with solutions of the dye in ethanol. The results are shown in Tables 13. In some cases, the solubility was accessed visually as judged by complete dissolution of the solid dye; these data are shown in Table 14.

TABLE 13

Solubility of Savinyl Solvent Dyes from Clariant in various microemulsion systems, wt % (spectrophotometric data)

| Dye | M #1 | M #5 | M #6 | M #7 | M #2 | M #11 | M #13 | M #18 | M #32 | M #33 |
|---|---|---|---|---|---|---|---|---|---|---|
| Savinyl blue GLS (668 nm) | 1.2 | >2.66 | >2.36 | >2.45 | >2.85 | 0.83 | 1.02 | 1.90 | 0.84 | 0.89 |
| Savinyl Pink 6BLS (542 nm) | 1.7 | >3.47 | >3.43 | >3.33 | >3.30 | 1.88 | 2.52 | >3.14 | 0.90 | 1.08 |
| Savinyl yellow RLS (430 nm) | 2.0 | >2.97 | >2.64 | >2.71 | >2.91 | 0.45 | 0.79 | 1.48 | 1.46 | 1.60 |

TABLE 13-continued

Solubility of Savinyl Solvent Dyes from Clariant in various microemulsion systems, wt %
(spectrophotometric data)

| Dye | M #1 | M #5 | M #6 | M #7 | M #2 | M #11 | M #13 | M #18 | M #32 | M #33 |
|---|---|---|---|---|---|---|---|---|---|---|
| Savinyl black NS (580 nm) | No data | >2.97 | >3.09 | >2.89 | >2.95 | 0.47 | 0.49 | 0.92 | >4.17 | 2.44 |

TABLE 14

Solubility of Savinyl Solvent Dyes from Clariant in Microemulsion #6, wt % (visual inspection)

| Dye | M #6 |
|---|---|
| Savinyl fire red 3GLS | >3 |
| Savinyl black RLSN | >3 |
| Savinyl blue RLS | <3 |
| Savinyl yellow RLSN | >3 |
| Savinyl Yellow 2GLS | >3 |
| Savinyl yellow 2RLS | >3 |
| Savinyl red 3BLS | >3 |

Example 5 (Comparative)

Solubility of Savinyl Dyes in Microemulsions Versus Solubility in Non-structured Solvents and Solvent Mixtures Solubilities of four Savinyl dyes (Clariant) were measured in water, 2-pyrrolidone, water-2-pyrrolidone binary mixtures, as well as in two octyl-2-pyrrolidone-based Microemulsions #1 and #2. The results are outlined in Table 15.

TABLE 15

Solubility of Savinyl Dyes in water, 2-pyrrolidone, water-2-pyrrolidone binary mixtures, and octyl-2-pyrrolidone-based microemulsions

| Solvent | Savinyl Yellow RLS | Savinyl Pink BLS | Savinyl Blue GLS | Savinyl Black NS |
|---|---|---|---|---|
| Water | <0.1% | <0.1% | <0.1% | <0.1% |
| 2-Pyrrolidone (2-P) | >33% | >33% | >33% | >33% |
| 20% 2P-80% water | 0.3% | 0.2% | 0.1% | 0.3% |
| 50% 2P-50% water | 0.3% | 0.2% | 0.1% | 0.3% |
| Microemulsion #1 (containing 7% octyl-2-pyrrolidone) | 2.0% | 1.7% | 1.2% | no data |
| Microemulsion #2 (containing 20% octyl-2-pyrrolidone) | >2.91% | >3.3% | >2.85% | >2.95% |

From Table 15, one can see that 2-Pyrrolidone (2-P) is an excellent solvent for Savinyl solvent dyes, and water is a very poor solvent. Binary mixtures of 2-P and water, even when the solvent load of 2-P in the system is as high as 50 wt %, dissolve the dyes at merely few tenths of percent. On the other hand, microemulsion systems, containing 7 and 20 wt % of octyl-2P, respectively, dissolve the dyes on the level of several percents.

Example 6 (Comparative)

Solubility of Savinyl Dyes in Microemulsions Versus Solubility in Non-structured Solvents and Solvent Mixtures Solubilities of Savinyl dyes in water, tetraethylene glycol, water-tetraethylene glycol binary mixtures, aqueous solutions of ethoxylated surfactants (microemulsions 13 and 18) are given in Table 16.

TABLE 16

Solubility of Savinyl Dyes in water, tetraethylene glycol, water-tetraethylene glycol binary mixtures, and aqueous solutions of ethoxylated surfactants

| Solvent | Savinyl Yellow RLS | Savinyl Pink BLS | Savinyl Blue GLS | Savinyl Black NS |
|---|---|---|---|---|
| Water | <0.1% | <0.1% | <0.1% | <0.1% |
| Tetra(ethylene glycol), {TEG}, (Aldrich) | >33% | >33% | >33% | >33% |
| 20% TEG-80% water | 0.07% | 0.03% | 0.05% | 0.16% |
| 50% TEG-50% water | 0.23% | 0.31% | 0.15% | 0.48% |
| Microemulsion #13 (containing 10% of Tergitol NP-10, Union Carbide) | 0.79% | 2.52% | 1.02% | 0.49% |
| Microemulsion #18 (containing 20% n-octyl-OCH$_2$CH$_2$)$_5$OH | 1.48% | 3.14% | 1.90% | 0.92% |

From Table 16, one can see that again, tetraethylene glycol (TEG) is an excellent solvent for Savinyl solvent dyes, and water is a poor solvent. Their binary mixtures are not effective solvents, and even 50—50 mixture of water and TEG dissolves less than 1% of the dyes. On the other hand, solutions of surfactants, such as Tergitol NP-10 and n-octyl (OCH$_2$CH$_2$)$_5$OH have a significantly higher solubilization capacity at much lower concentration in the formulation. Structurally, Tergitol NP-10 surfactant represents a nonylphenol ether of ethylene oxide, containing on average 10 ethylene oxide groups.

Example 7

Printability and Color Gamut of Microemulsion Inks

Figure 2:
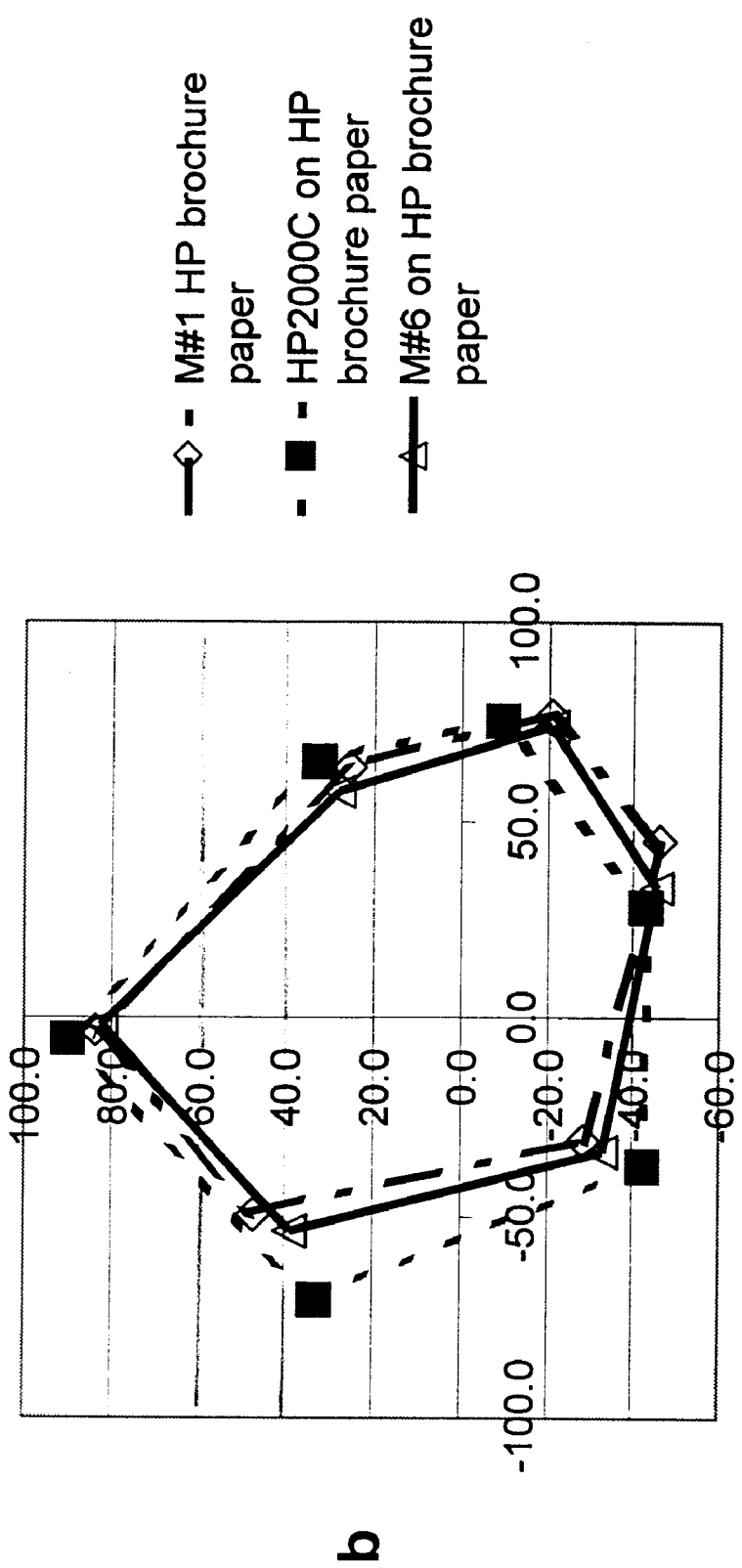
FIGS. 2 and 3 are color gamut charts showing the color performance of Microemulsion #6 compared to the color performance of Hewlett Packard HP2000C Ink Jet Printer on Hewlett Packard Professional Brochure & Flyer Paper, Two-Sided Gloss (FIG. 2) and Champion Data Copy office paper (Champion) (FIG. 3) respectively.
Figure 3:
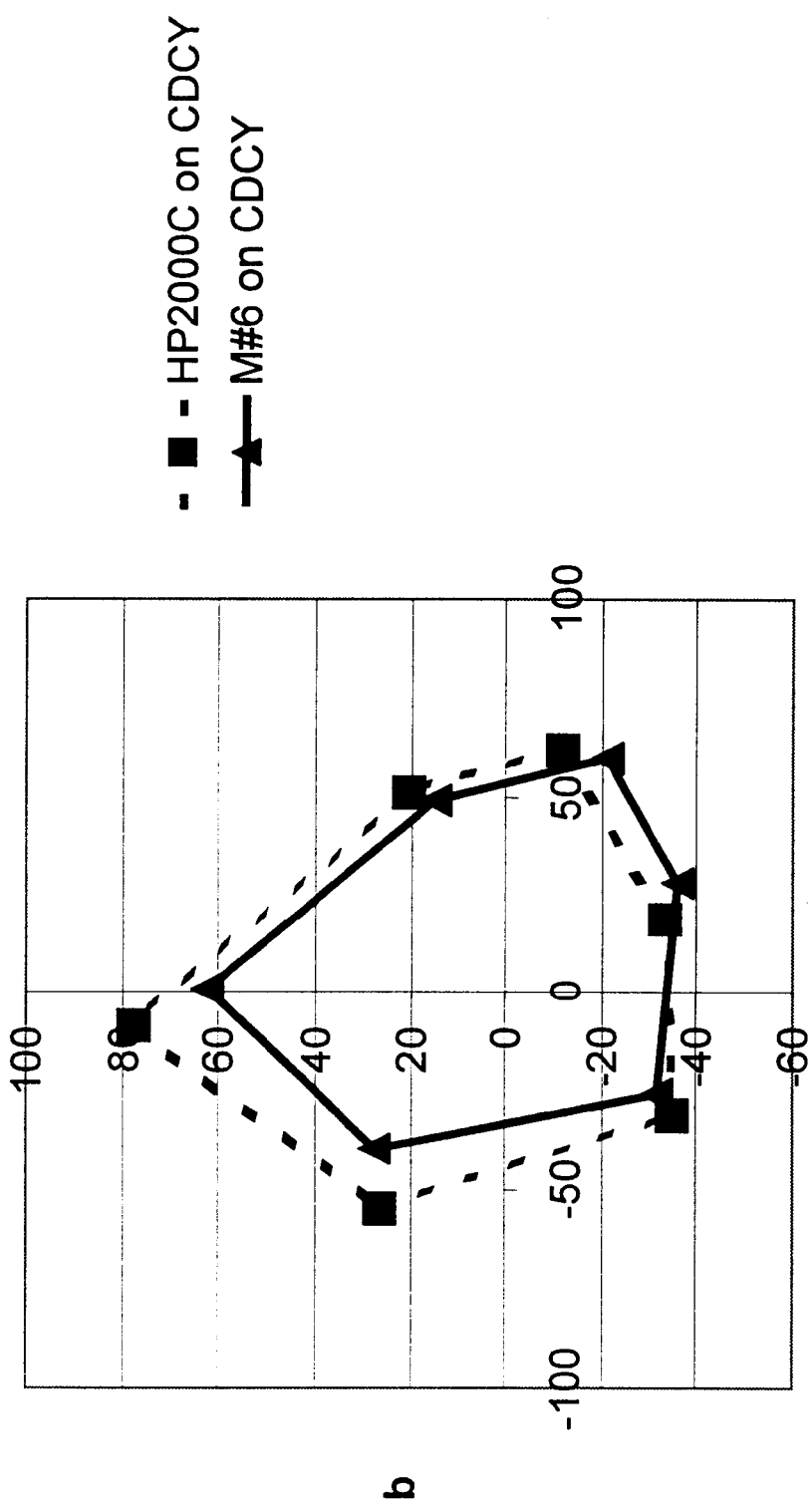

Savinyl dyes from Clariant: Savinyl Blue GLS, Savinyl Yellow RLS, and Savinyl Pink 6BLS were dissolved in Microemulsions #1 and #6. In order to dissolve the dye, 3% of a dry dye was added to the microemulsion and the system was left on rolls overnight. For Microemulsion #6, the dissolution was complete; for Microemulsion #1, the dissolution was not complete and the inks were filtered from the excess dye. The inks were then filled into color printheads of an HP 2000c Hewlett Packard printer. The inks showed good print quality on office and special inkjet papers, specifically, no missing nozzles, controlled wicking and almost instant drying. The color gamut volume was somewhat less than that of the HP2000c, as shown in FIGS. 2 and 3. The ink flux per unit area was 8 pL per 1/600 sq. inch for primary and 16 pL per 1/600pL secondary colors for HP2000c default inks and for Microemulsion #6; it was ×2 higher for Microemulsion #1 inks.

Example 8

Performance of a Microemulsion-based Black

Figure 4:
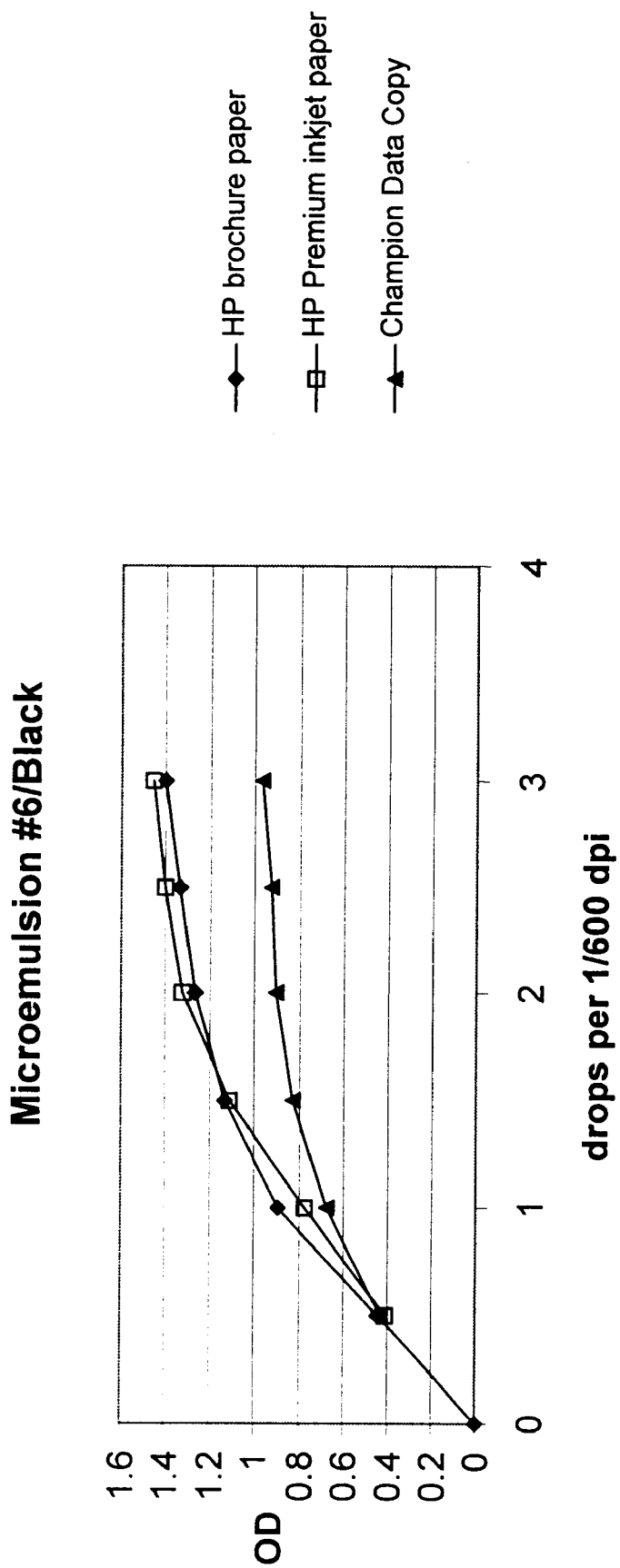
FIG. 4 plots drops per 1/600 dpi against optical density for Microemulsion #6/Savinyl NS Black on Hewlett Packard Professional Brochure & Flyer Paper, Two-Sided Gloss, Hewlett Packard Premium Inkjet Paper, and Champion Data Copy office paper (Champion) papers.

3% of Savinyl Black NS was added as a dry powder to Microemulsion #6. The sample was put on rolls overnight and a color pen of an HP2000c Hewlett Packard printer was filled. The inks printed well both on the office and special offset papers. Wicking was moderate and optical density was good, as shown in FIG. 4, which represents the plot of the black optical density versus the number of drops per 1/600-inch pixel.

Example 9

Durability of Microemulsion Inks (Waterfastness, Wet Smudge, Highlighter Smear).

Savinyl dyes from Clariant: Savinyl Blue GLS, Savinyl Yellow RLS, and Savinyl Pink 6BLS were dissolved in Microemulsions #6 and #7 at 3 wt %. Waterfastness to passive water drip was evaluated by dripping 200 ml of water on a printout tilted at 45 degrees. The optical density transfer between the rectangular bars was measured using a MacBeth spectrophotometer. Wet smudge was measured similarly, with the difference that after dripping the water, the image was smudged by finger in a rubber glove. Alkaline highlighter smear was measured by using a Major Accent Highlighter (Sanford). The results of testing are summarized in Tables 17 and 18.

TABLE 17

Durability of microemulsion inks (10 minutes after printing)

| Paper | dyes | waterfastness | wet smudge | Initial Optical Density | Highlighter smear, 1 pass | Highlighter smear, 2 pass | Highlighter smear, 3 pass | Microemulsion system |
|---|---|---|---|---|---|---|---|---|
| HP Premium Inkjet paper | Cyan | 0.06 | 0.06 | 0.97 | 0.00 | 0.02 | 0.06 | M #6 |
| same | Magenta | 0.10 | 0.10 | 1.31 | 0.01 | 0.12 | 0.16 | M #6 |
| same | Yellow | 0.03 | 0.03 | 1.03 | n/a | n/a | n/a | M #6 |
| same HP Professional Brochure paper | Cyan | 0.00 | 0.01 | 0.98 | 0.00 | 0.00 | 0.01 | M #6 |
| same | Magenta | 0.16 | 0.02 | 1.44 | 0.02 | 0.03 | 0.04 | M #6 |
| same | Yellow | 0.00 | 0.00 | 1.12 | n/a | n/a | n/a | M #6 |
| same | Black | 0.01 | 0.04 | 1.60 | 0.01 | 0.04 | 0.06 | M #7 |
| Champion Data Copy Paper | Cyan | 0.14 | 0.06 | 0.81 | 0.00 | 0.01 | 0.02 | M #6 |
| same | Magenta | 0.12 | 0.19 | 0.96 | 0.00 | 0.02 | 0.02 | M #6 |
| same | Yellow | 0.07 | 0.07 | 0.80 | n/a | n/a | n/a | M #6 |
| same | Black | 0.04 | 0.09 | 0.99 | 0.00 | 0.01 | 0.01 | M #7 |

It has been found that moderate heat after printing improves the durability considerably. Table 18 shows the durability results after heat treatment of the prints with a heat gun (~100 C. for 1 minute).

TABLE 18

Durability of heated samples

| Paper | dyes | waterfastness | wet smudge | Initial Optical Density | Highlighter smear, 1 pass | Highlighter smear, 2 pass | Highlighter smear, 3 pass | Microemulsion system |
|---|---|---|---|---|---|---|---|---|
| HP Professional Brochure paper | Cyan | 0.01 | 0.01 | 0.95 | 0.00 | 0.00 | 0.00 | M #6 |
| same | Magenta | 0.05 | 0.15 | 1.41 | 0.00 | 0.01 | 0.06 | M #6 |
| same | Yellow | 0.00 | 0.01 | 1.07 | n/a | n/a | n/a | M #6 |
| same | Black | 0.00 | 0.04 | 1.52 | 0.00 | 0.01 | 0.09 | M #7 |
| Champion | Cyan | 0.02 | 0.03 | 0.75 | 0.00 | 0.00 | 0.01 | M #6 |

TABLE 18-continued

Durability of heated samples

| Paper | dyes | waterfast-ness | wet smudge | Initial Optical Density | Highlighter smear, 1 pass | Highlighter smear, 2 pass | Highlighter smear, 3 pass | Micro-emulsion system |
|---|---|---|---|---|---|---|---|---|
| Data Copy Paper | | | | | | | | |
| same | Magenta | 0.11 | 0.11 | 0.98 | 0.07 | 0.10 | 0.12 | M #6 |
| same | Yellow | 0.07 | 0.01 | 0.81 | n/a | n/a | n/a | M #6 |
| same | Black | 0.00 | 0.03 | 1.02 | 0.00 | 0.00 | 0.00 | M #7 |

From Tables 17 and 18, one can see that a substantial level of durability can be attained for cyan, yellow and black, worse results are seen for magenta.

Example 10

Lightfastness of Microemulsion Inks

Lightfastness of the inks prepared based on Microemulsions #1 (Savinyl Blue GLS, Savinyl Yellow RLS, and Savinyl Pink 6BLS dissolved to saturation) and Microemulsion #6 (Savinyl Black NS dye dissolved at 3%). The testing was done using an Atlas HPUV indoor exposure system, with 1 yr. exposure simulated. The loss of optical density (OD) after exposure is shown in Table 19 below.

TABLE 19

Optical density loss of microemulsion inks after 1 year exposure outdoors (simulated), 1 yr. = 1971 kLux × hr.

| | Hammermill Fore DP | | | HP Premium Inkjet Paper | | | HP Premium Brochure Paper | | |
|---|---|---|---|---|---|---|---|---|---|
| | OD before | OD 1 yr. | ratio | OD before | OD 1 yr. | ratio | OD before | OD 1 yr. | ratio |
| cyan M #1 | 0.48 | 0.47 | 0.98 | 0.58 | 0.54 | 0.93 | 0.61 | 0.58 | 0.95 |
| | 0.81 | 0.79 | 0.98 | 0.98 | 1 | 1.02 | 1.06 | 1.09 | 1.03 |
| magenta M #1 | 0.51 | 0.31 | 0.61 | 0.5 | 0.21 | 0.42 | 0.61 | 0.28 | 0.46 |
| | 0.91 | 0.7 | 0.77 | 0.92 | 0.41 | 0.45 | 1.12 | 0.65 | 0.58 |
| yellow M #1 | 0.59 | 0.56 | 0.95 | 0.63 | 0.58 | 0.92 | 0.75 | 0.71 | 0.95 |
| | 0.9 | 0.85 | 0.94 | 1.13 | 1.11 | 0.98 | 1.19 | 1.15 | 0.97 |
| black M #6 | 0.49 | 0.484 | 0.99 | 0.47 | 0.47 | 1.00 | 0.5 | 0.5 | 1.00 |
| | 0.99 | 0.99 | 1.00 | 1.17 | 1.17 | 1.00 | 0.95 | 0.94 | 0.99 |

From Table 19, one can see that cyan, yellow and black show only minimal loss in optical density and are lightfast. On the other hand, magenta is not lightfast enough.

Example 11

Gloss Levels of Microemulsion Inks

In the Table 20 below, the gloss levels of Microemulsion #1 based inks, described in Example 7, are shown on HP Professional Brochure and Flyer Paper, at the same ink flux as in Example 7. For comparison, Hewlett Packard LaserJet 4500 gloss levels are shown. The measurements were done at 60 degrees using a Micro-TRI-glossmeter (Gardener).

TABLE 20

Gloss levels of Microemulsion #1-based inks versus those of LaserJet 4500

| Printer | No colorant (control) | Cyan | Magenta | Yellow | Red | Green | Blue |
|---|---|---|---|---|---|---|---|
| Ink of this invention | 51.2 | 47.4 | 47.5 | 47.4 | 37.8 | 36.8 | 35.6 |
| LaserJet 4500 | 45.7 | 3.1 | 3.2 | 3.9 | 3.7 | 3.3 | 3.1 |

Obviously, the inks of the current invention conserve the gloss of the paper to a considerable degree, while LaserJet substantially reduces the gloss.

Example 12

Durability and Lightfastness of Other Solvent-dye-based Microemulsion Inks

The Savinyl dyes from Clariant: Black RLSN, Blue RLS, Red 3 BLS, Fire Red 3 GLS, Yellow 2 GLS, Yellow 2 RLS, and Yellow RLSN have been dissolved in Microemulsion #6 at 3%. The dissolution was complete for all the dyes except for the blue. The solutions were filtered through 0.45 μm filter and were filled into color pens of HP 2000c Hewlett Packard printer. The inks printed well and did not show significant wicking on office paper. The inks showed excellent Lightfastness, as measured by the method described in Example 10, (Table 21), and durability, as measured by the methods described in Example 9 (Table 22).

TABLE 21

Lightfastness of Savinyl Dyes in Microemulsion #6
(1 yr. simulated)

| Paper: Hammermill Fore DP | before fade | | after fade | | fading ratio | |
|---|---|---|---|---|---|---|
| | optical density | | | | | |
| 1. Savinyl Black RLSN: | 1.08 | 0.608 | 1.06 | 0.61 | 0.98 | 1.00 |
| 2. Savinyl Blue RLS: | 0.372 | 0.108 | 0.337 | 0.1 | 0.91 | 0.93 |
| 3. Savinyl Red 3 BLS: | 0.922 | 0.268 | 0.911 | 0.272 | 0.99 | 1.01 |
| 4. Savinyl Fire Red 3 GLS: | 1.04 | 0.372 | 0.972 | 0.331 | 0.93 | 0.89 |
| 5. Savinyl Yellow 2 GLS: | 0.858 | 0.282 | 0.802 | 0.178 | 0.93 | 0.63 |
| 6. Savinyl Yellow 2 RLS: | 0.839 | 0.238 | 0.859 | 0.267 | 1.02 | 1.12 |
| 7. Savinyl Yellow RLSN: | 0.97 | 0.323 | 0.951 | 0.335 | 0.98 | 1.04 |
| HP brochure paper | | | | | | |
| 1. Savinyl Black RLSN: | 1.52 | 0.975 | 1.52 | 0.947 | 1.00 | 0.97 |
| 2. Savinyl Blue RLS: | 0.389 | 0.099 | 0.336 | 0.099 | 0.86 | 1.00 |
| 3. Savinyl Red 3 BLS: | 1.2 | 0.282 | 1.18 | 0.293 | 0.98 | 1.04 |
| 4. Savinyl Fire Red 3 GLS: | 1.52 | 0.362 | 1.5 | 0.288 | 0.99 | 0.80 |
| 5. Savinyl Yellow 2 GLS: | 1.15 | 0.222 | 1.13 | 0.249 | 0.98 | 1.12 |
| 6. Savinyl Yellow 2 RLS: | 1.04 | 0.227 | 1.03 | 0.259 | 0.99 | 1.14 |
| 7. Savinyl Yellow RLSN: | 1.23 | 0.316 | 1.22 | 0.334 | 0.99 | 1.06 |

TABLE 22

Durability of Savinyl Dyes in Microemulsion #6
PAPER: Hammermill Fore DP

| | wet smudge | waterfastness | highlighter smear | |
|---|---|---|---|---|
| Black RLSN: | 0.04 | 0.01 | 0.01 | 1pass Alkali |
| | | | 0.02 | 2pass Alkali |
| | | | 0.02 | 3pass Alkali |
| | | | 0.01 | 1pass Acid |
| | | | 0.02 | 2pass Acid |
| | | | 0.04 | 3pass Acid |
| Blue RLS | 0.00 | 0.00 | 0.00 | 1pass Alkali |
| | | | 0.00 | 2pass Alkali |
| | | | 0.00 | 3pass Alkali |
| | | | 0.00 | 1pass Acid |
| | | | 0.00 | 2pass Acid |
| | | | 0.00 | 3pass Acid |
| Red 3BLS | no data | no data | 0.00 | 1pass Alkali |
| | | | 0.00 | 2pass Alkali |
| | | | 0.01 | 3pass Alkali |
| | | | 0.00 | 1pass Acid |
| | | | 0.00 | 2pass Acid |
| | | | 0.01 | 3pass Acid |
| Fire Red 3GLS | 0.04 | 0.03 | 0.02 | 1pass Alkali |
| | | | 0.01 | 2pass Alkali |
| | | | 0.01 | 3pass Alkali |
| | | | 0.05 | 1pass Acid |
| | | | 0.04 | 2pass Acid |
| | | | 0.05 | 3pass Acid |
| Yellow 2 RLS | 0.09 | 0.07 | n/a | n/a |
| Yellow 2 RLSN | 0.02 | 0.04 | n/a | n/a |
| Yellow 2 GLS | 0.02 | 0.01 | n/a | n/a |
| HP Brochure paper | | | | |
| Black RLSN: | 0.00 | 0.00 | 0.00 | 1pass Alkali |
| | | | 0.00 | 2pass Alkali |
| | | | 0.00 | 3pass Alkali |
| | | | 0.00 | 1pass Acid |
| | | | 0.00 | 2pass Acid |
| | | | 0.00 | 3pass Acid |
| Blue RLS | 0.00 | 0.00 | 0.00 | 1pass Alkali |
| | | | 0.00 | 2pass Alkali |
| | | | 0.01 | 3pass Alkali |
| | | | 0.00 | 1pass Acid |
| | | | 0.00 | 2pass Acid |
| | | | 0.00 | 3pass Acid |
| Red 3BLS | 0.00 | 0.00 | 0.00 | 1pass Alkali |
| | | | 0.01 | 2pass Alkali |
| | | | 0.04 | 3pass Alkali |
| Fire Red 3GLS | No data | No data | 0.01 | 1pass Acid |
| | | | 0.03 | 2pass Acid |
| | | | 0.04 | 3pass Acid |
| Yellow 2 RLS | 0.00 | 0.00 | n/a | n/a |
| Yellow 2 RLSN | 0.00 | 0.00 | n/a | n/a |
| Yellow 2 GLS | 0.01 | 0.00 | n/a | n/a |

What is claimed is:

1. An aqueous inkjet ink composition comprising:
   (a) solvent dye molecules;
   (b) micelles comprising a solvent of a formula R—S, S being a solvent dye-solubilizing group and R being a hydrophobic group; and
   (c) an aqueous vehicle,
wherein the micelles are surrounded by the aqueous vehicle, each micelle having a monolayer surface enclosing an inside area of the micelle, the hydrophobic groups (R) extending into the inside area of the micelle from the monolayer surface and the solvent dye-solubilizing group (S) being at the monolayer surface of the micelles, and the solvent dye molecules associating with the solvent dye-solubilizing groups (S) at the monolayer surface of the micelles, the micelles separating the solvent dye particles from the aqueous vehicle and wherein the solvent dye-solubilizing groups (S) are derived from 2-pyrrolidone.

2. An aqueous inkjet ink composition of claim 1, wherein the micelles further comprise surfactants.

3. An aqueous ink of claim 2, wherein the micelles further comprise co-surfactants.

4. The aqueous inkjet ink composition of claim 1, wherein the hydrophobic group has from 4 to 20 carbon atoms.

5. The aqueous inkjet ink composition of claim 1, wherein the hydrophobic group (R) and the solvent-dye solubilizing group (S) form the solvent of the formula R—S with a bond between R and S selected from a carbon-carbon bond, a carbon-oxygen ether bond, a carbon-oxygen ester bond, a carbon-nitrogen amine bond and a carbon-nitrogen amide bond.

6. The aqueous inkjet ink composition of claim 1, wherein the aqueous inkjet ink composition is comprised of from 1 to 5 wt. percent dye.

7. The aqueous inkjet ink composition of claim 1, wherein the aqueous inkjet ink composition is comprised of from 5 to 50 wt. percent of the solvent having the formula R—S.

8. The aqueous inkjet ink composition of claim 1, wherein the aqueous inkjet ink composition is comprised of from 50 to 80 wt. percent of the aqueous vehicle.

9. A method of making an aqueous inkjet ink composition comprising solvent dye, the method comprising the steps of:
   a) forming micelles in an aqueous vehicle by adding chemical compounds to an aqueous vehicle, the chemical compounds comprising a solvent of a formula R—S, R being a hydrophobic group and S being a solvent dye-solubilizing group, each micelle having a monolayer surface enclosing an inside area of the micelle, the hydrophobic groups (R) extending into the inside area of the micelle and the solvent dye-solubilizing groups (S) being at the monolayer surface of the micelle; and b) solubilizing solvent dye molecules in the aqueous vehicle by adding solvent dye molecules to the aqueous vehicle of a), the solvent dye molecules associating with the solvent dye-solubilizers at the monolayer surface of the micelles, the micelles separating the solvent dye particles from the aqueous vehicle;

and wherein the solvent dye-solubilizing groups (S) are derived from 2-pyrrolidone.

10. The method of claim 9, wherein the micelle further comprises surfactants.

11. The method of claim 10, wherein the micelle monolayer moieties further comprises co-surfactants.

12. The method of claim 9, wherein the hydrophobic group has from 4–20 carbon atoms.

13. The method of claim 9, wherein the hydrophobic group (R) and the solvent dye-solubilizing group (S) form the solvent of the formula R—S with a bond between R and S selected from a carbon-carbon bond, a carbon-oxygen ether bond, a carbon-oxygen ester bond, a carbon-nitrogen amine bond and a carbon-nitrogen amide bond.

14. The method of claim 9, wherein the aqueous inkjet ink composition is comprised of from 1 to 5 wt. percent dye.

15. The method of claim 9, wherein the aqueous inkjet ink composition is comprised of from 5 to 50 wt. percent of the solvent having the formula R—S.

16. The method of claim 9, wherein the aqueous inkjet ink composition is comprised of from 50 to 80 wt. percent of the aqueous vehicle.

* * * * *